United States Patent
Kuroda et al.

[11] Patent Number: 5,946,277
[45] Date of Patent: Aug. 31, 1999

[54] METHOD AND APPARATUS FOR RECORDING INFORMATION FILES TO A RECORDING MEDIUM

[75] Inventors: Kazuo Kuroda; Toshio Suzuki; Takeshi Koda; Nobuyuki Takakuwa, all of Tokorozawa, Japan

[73] Assignee: Pioneer Electronic Corporation, Tokyo, Japan

[21] Appl. No.: 09/010,537

[22] Filed: Jan. 22, 1998

[30] Foreign Application Priority Data

Jan. 27, 1997 [JP] Japan .................................. 9-012672

[51] Int. Cl.[6] .............................. G11B 17/22; G11B 7/00
[52] U.S. Cl. ................................................. 369/32; 369/58
[58] Field of Search ................................. 369/32, 58, 47, 369/48, 49, 54, 124, 275.3, 59, 60; 360/39, 48, 32; 386/97, 106, 126

[56] References Cited

U.S. PATENT DOCUMENTS

| | | | |
|---|---|---|---|
| 5,475,668 | 12/1995 | Azumatani et al. | 369/58 |
| 5,481,519 | 1/1996 | Hosoya | 369/58 |
| 5,596,564 | 1/1997 | Fukushima et al. | 369/275.3 |

*Primary Examiner*—Ali Neyzari
*Attorney, Agent, or Firm*—Morgan, Lewis & Bockius LLP

[57] ABSTRACT

Information file recording method and apparatus are devised to have high recording efficiency. In parallel with the recording of an information file on a recording medium, file management data relating to the information file is once recorded in a memory. The file management data is retrieved from the memory and recorded in a predetermined area of the recording medium.

9 Claims, 11 Drawing Sheets

METHOD AND APPARATUS FOR RECORDING INFORMATION FILES TO A RECORDING MEDIUM

BACKGROUND OF THE INVENTION

1. Field of the Invention

The present invention relates to a recording method for recording information files on a recording medium, and an apparatus therefor.

2. Description of Related Art

An incremental write system is known as a recording method for write-once type recording media, represented by CD-R.

FIG. 1 shows a recording format on a recording disc produced by the incremental write system.

In the incremental write system, a lead-in area LI, a lead-out area LO, and an area for recording file management data PVD (Primary Volume Descripter) shown in FIG. 1 are previously secured on the recording disc. If an information file $F_1$ having a size of at least one file is to be recorded on the recording disc, the information file $F_1$ is recorded on the recording medium after the area of the file management data PVD. However, at the head position of the information file $F_1$, a file management data piece V-PVD$_1$ relating to the information file $F_1$ itself is recorded. The file management data V-PVD indicates the attribute, directory, and so on, of the information file to be recorded from the immediately following position.

When writing a new information file $F_2$ additionally on the recording disc described above, the new information file $F_2$ is written after the information file $F_1$. In this process, a new file management data piece V-PVD$_2$ is recorded at the head position of the information file $F_2$ as in the process described above. However, the file management data piece V-PVD$_2$ also includes the contents of the file management data piece V-PVD$_1$ described above.

Subsequently, the additional writing of data is performed in the similar manner as described above, and a file management data V-PVDn obtained finally is recorded in the area of the file management data PVD. By this procedure, the recording operation on a recording disc is completed.

The recording method described above, however, has a drawback that the data amount of the file management data V-PVD (file management data V-PVDn is the maximum) increases each time an information file is recorded additionally. This has been causing to limit the recording size of the information files themselves recordable on a single disc.

OBJECT AND SUMMARY OF THE INVENTION

The present invention is devised to solve the problem mentioned above, and an object of the present invention is to provide a recording method and recording apparatus by which the efficiency of recording on the recording medium is increased.

According to the present invention, an information file recording method for recording information by an information recording apparatus including a recording medium driving means for driving a loaded recording medium to record data on the recording medium and an erasable memory means, the recording method comprises a first step of recording an information file on the recording medium, a second step of recording file management data relating to the information file on the memory means; and a third step of retrieving the file management data stored in the memory means and recording the file management data in a predetermined area of the recording medium.

According to the present invention, a recording apparatus for recording an information file on a loaded recording medium comprises a memory means for storing file management data relating to the information file, a recording medium driving means for driving the recording medium to record the information file on the recording medium, and an ejecting means for ejecting the recording medium in response to an ejection operation, wherein the recording medium driving means performs the operations of retrieving the file management data from the memory means immediately before the recording medium is ejected by the ejecting means, and recording the file management data in a predetermined area of the recording medium.

DETAILED DESCRIPTION OF THE PREFERRED EMBODIMENT

Figure 2:
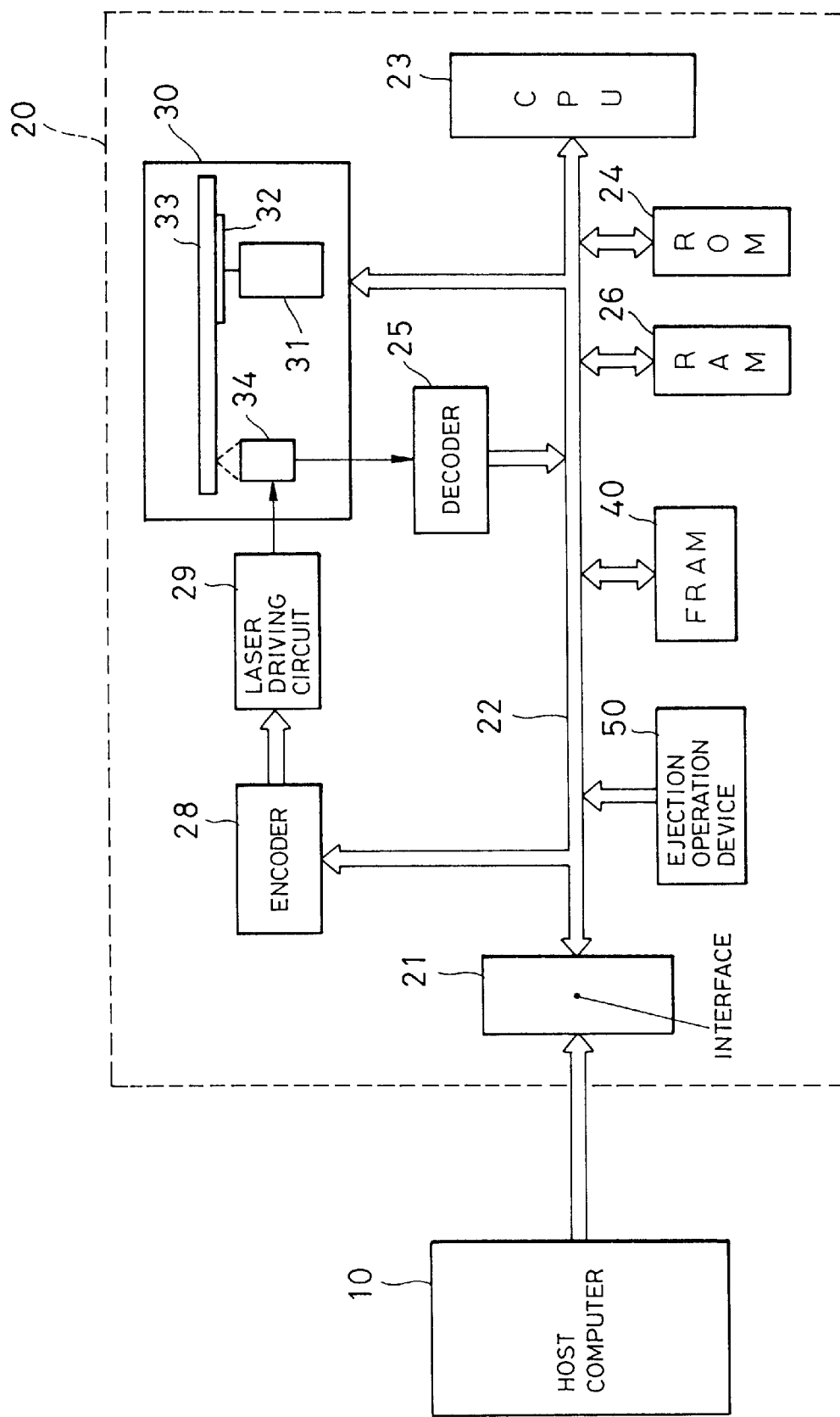
FIG. 2 is a block diagram showing the structure of an information recording apparatus 20 which performs the recording of information based on the information file recording method according to the present invention.

FIG. 2 is a diagram showing an information recording apparatus 20 which records information files on a DVD-R (digital video disc write once) as write once-type recording medium using the information file recording method according to the present invention.

As shown in the figure, the information recording apparatus 20 has a configuration including a DVD drive unit 30 which includes a spindle motor 31 with a turntable 32 and a recording/reproduction head 34, and additionally an encoder 28, a laser driving circuit 29 connected to the encoder 28 and connecting to the recording/reproduction head 34, a decoder 25, a CPU 23, a ROM 24, a RAM (random access memory) 26, an FRAM (RAM) 40, an ejection operation device 50. These parts are interconnected by a bus 22 in the manner as indicated in FIG. 2, and the apparatus 20 is mutually connected with a host computer 10 by means of an interface 21.

In the apparatus shown in FIG. 2, when the recording disc 33 as DVD-R is loaded on the turntable 32 provided in the DVD drive unit 30, the CPU 23 starts the execution of an information recording subroutine illustrated in FIGS. 3 through FIG. 7 which has previously been stored in ROM 24.

In the following, explanation will be made on each of the processing steps of the information recording subroutine with reference to the flowcharts of FIG. 3 through FIG. 7.

Figure 3:
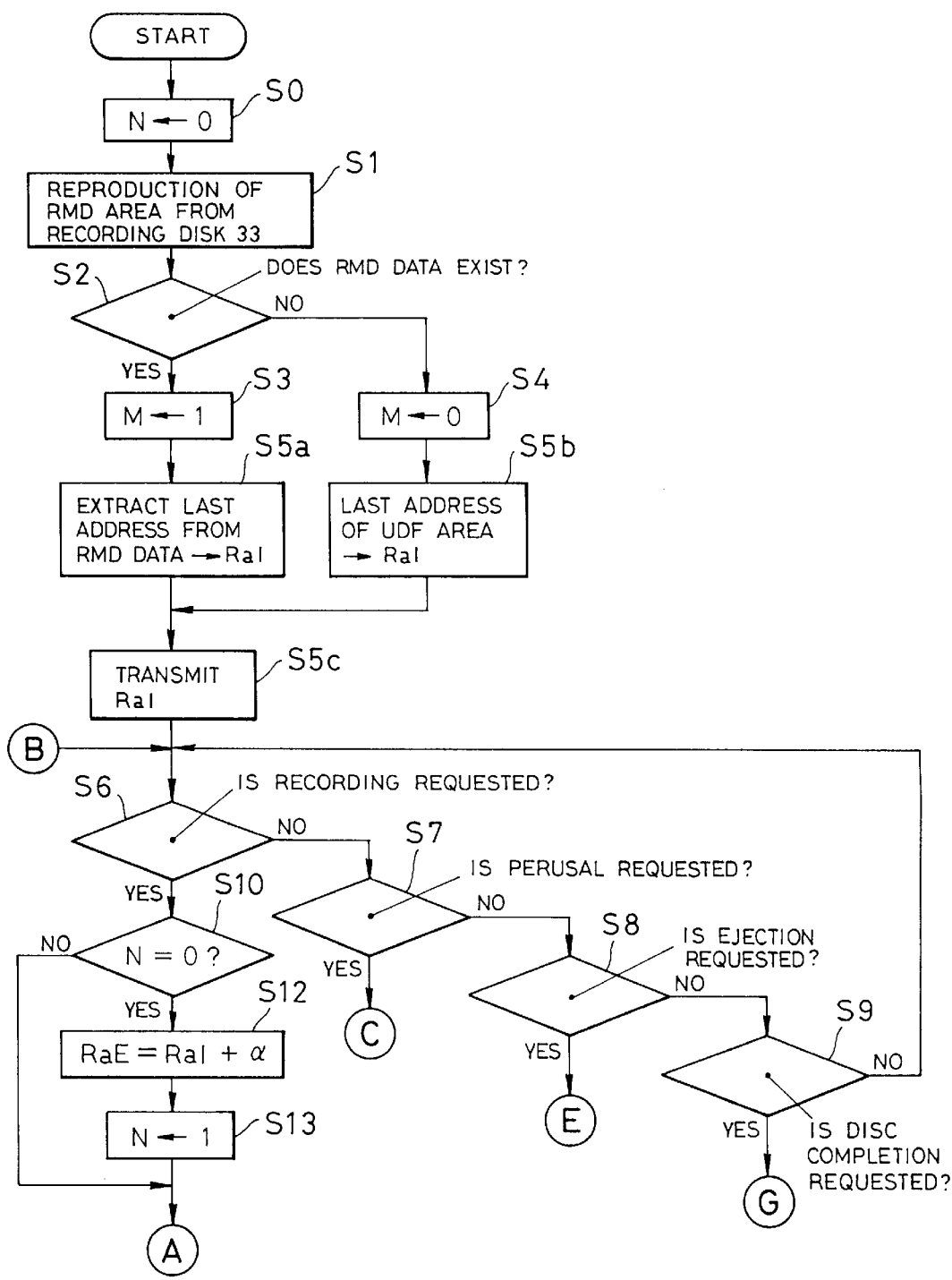
FIG. 3 is a flowchart showing a part of an information recording subroutine based on the information file recording method according to the present invention.
Figure 4:
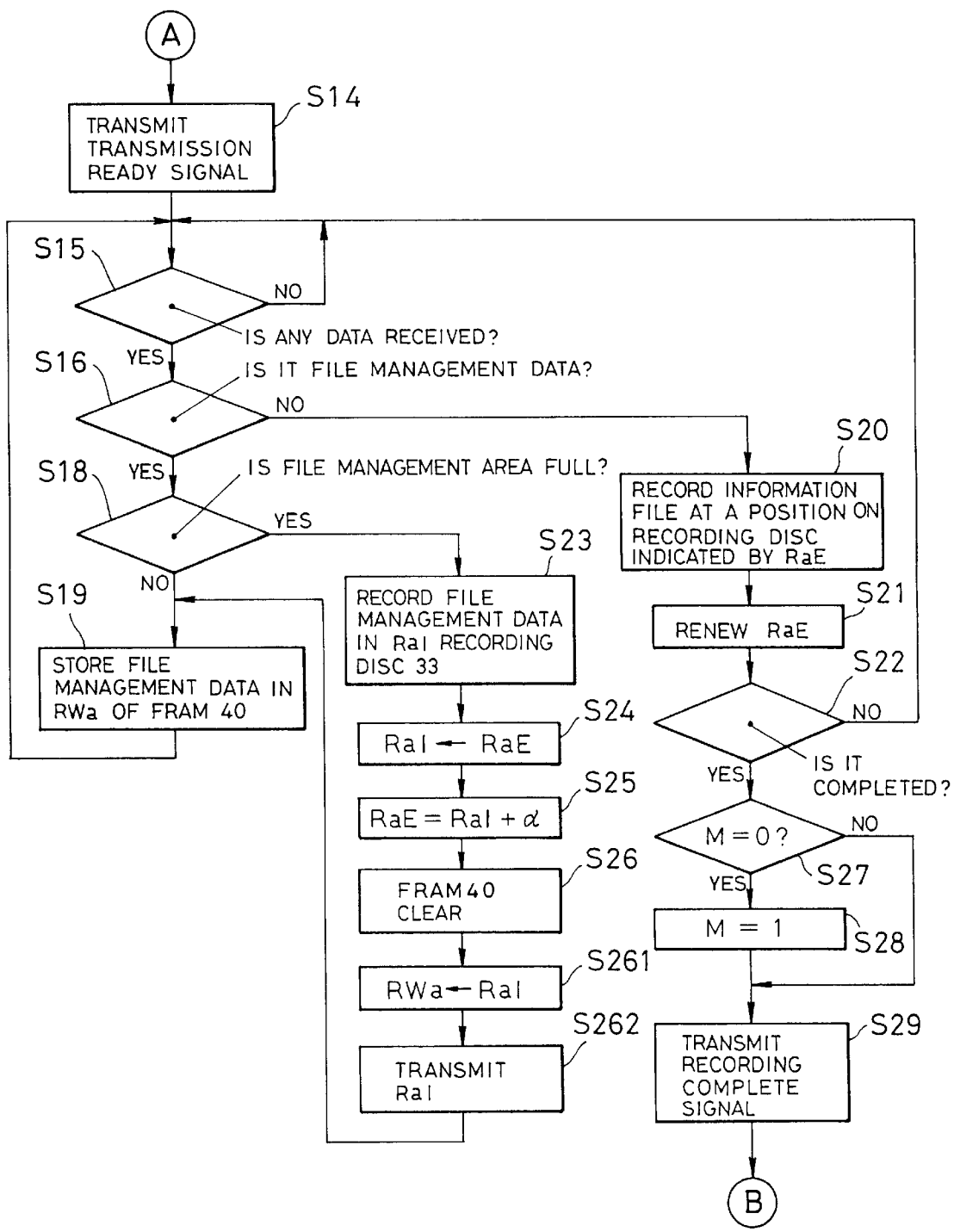
FIG. 4 is a flowchart showing a part of the information recording subroutine based on the information file recording method according to the present invention.
Figure 5:
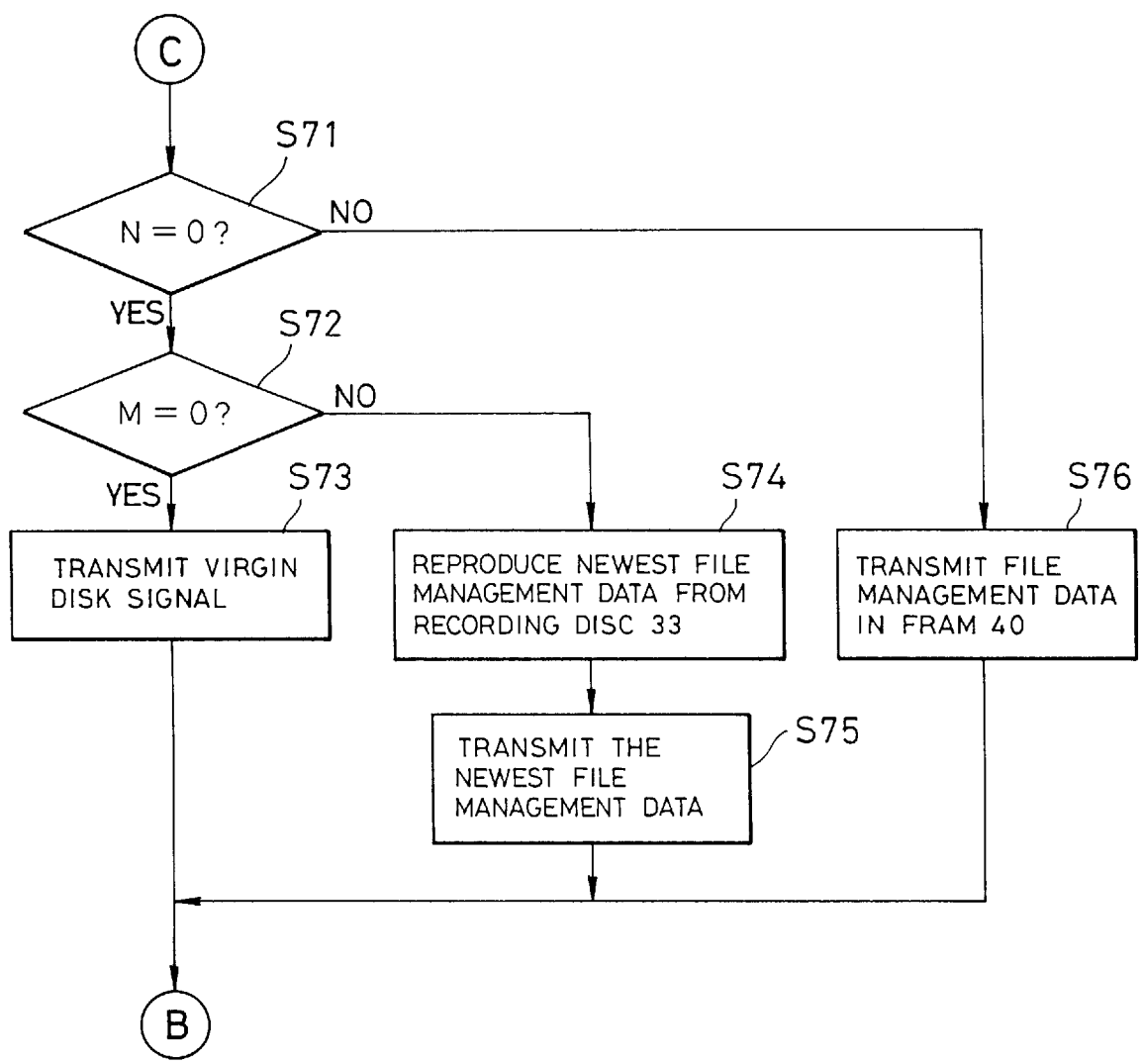
FIG. 5 is a flowchart showing a part of the information recording subroutine based on the information file recording method according to the present invention.
Figure 6:
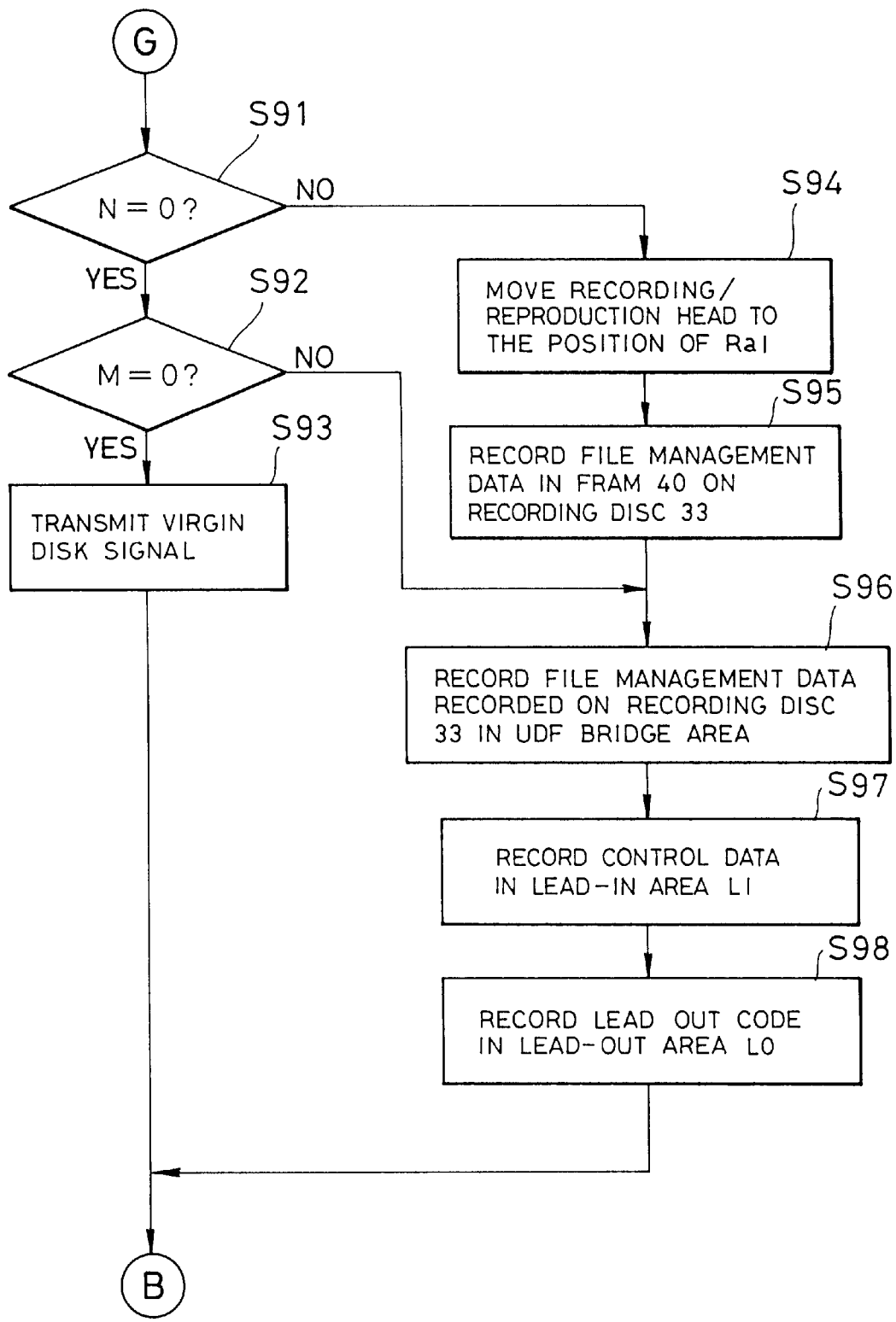
FIG. 6 is a flowchart showing a part of the information recording subroutine based on the information file recording method according to the present invention.
Figure 7:
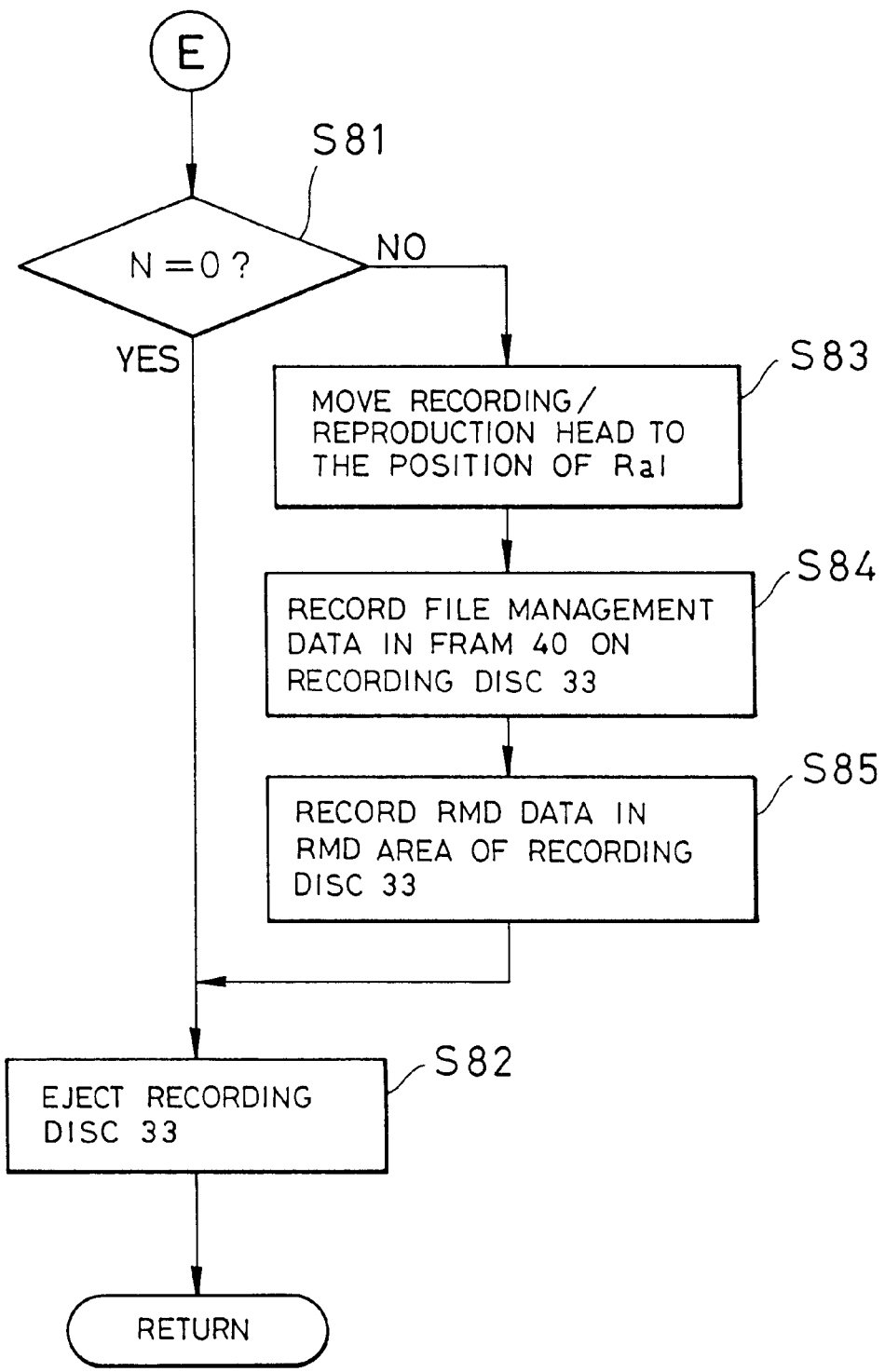
FIG. 7 is a flowchart showing a part of the information recording subroutine based on the information file recording method according to the present invention.
Figure 8:
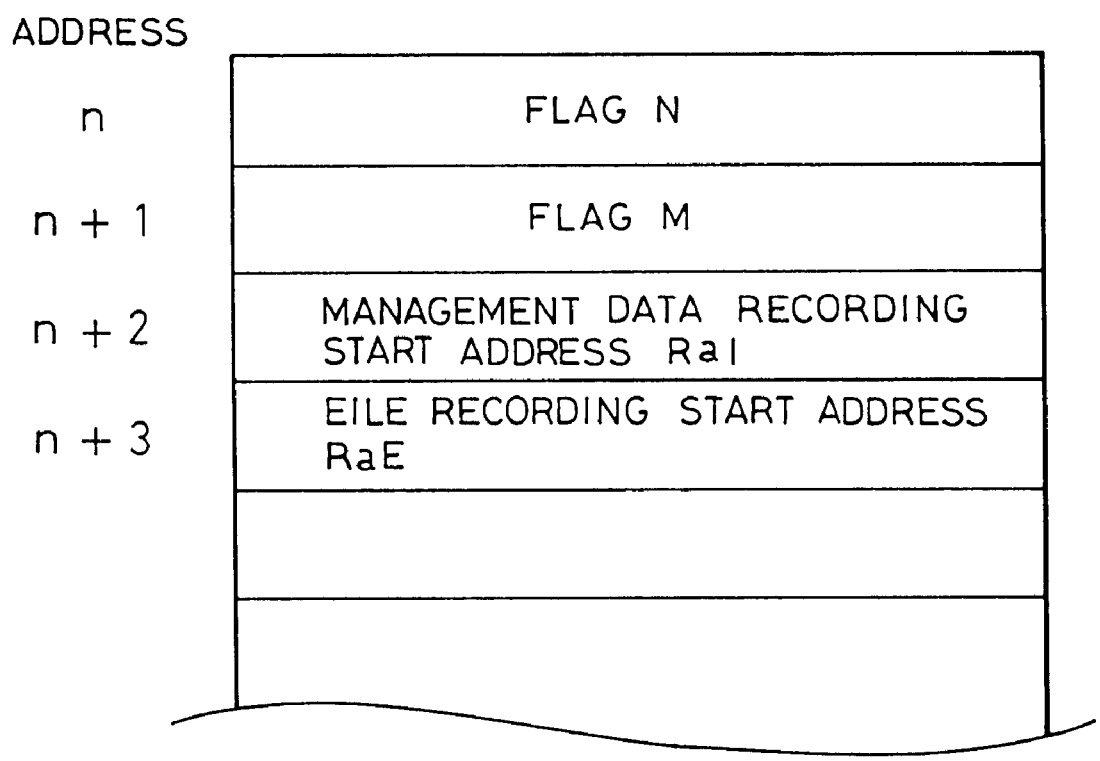
FIG. 8 is a diagram showing a part of the memory map of RAM 26.
Figure 9:
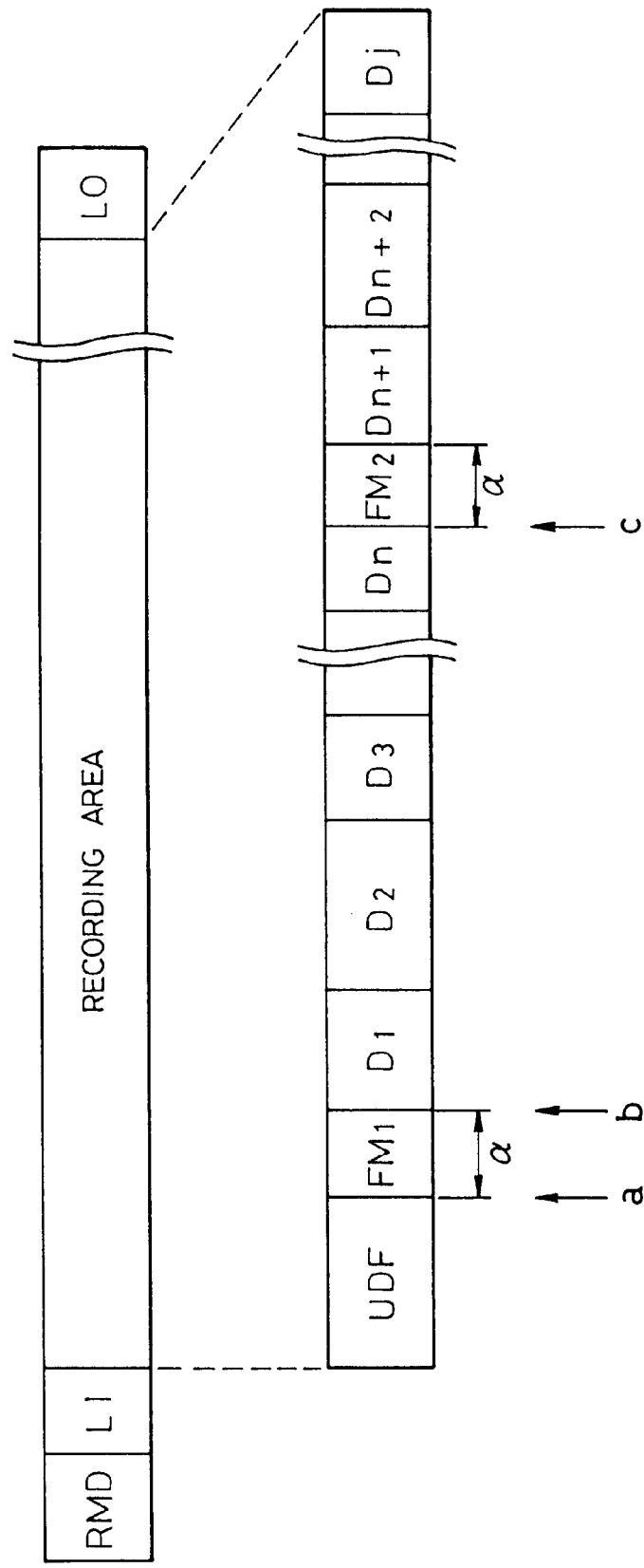
FIG. 9 is a diagram showing a recording format on the recording disc 33.

In FIG. 3, the CPU 23 records a flag N having a logical value "0" representing that a first processing is being executed against the recording disc 33, at an address "n" of the RAM 26 as shown in FIG. 8 (Step S0). The CPU 23 then transmits a reproduction instruction signal to the DVD drive unit 30 to read RMD data from an RMD area provided inside of the lead-in area LI on the recording disc 33 as illustrated in FIG. 9 (step S1). In response to the reproduction instruction signal, the spindle motor 31 provided in the DVD drive unit 30 rotates the recording disc 33 loaded on its turntable 32. Furthermore, a recording/reproduction head 34 is moved to the above-mentioned RMD area, to read data recorded therein. The read signal retrieved by the recording/reproduction head 34 is supplied to a decoder 25. The decoder 25 converts the read signal to a digital signal, and further effects demodulation and error correction operations to the digital signal, to obtain reproduced information data which in turn is transmitted to a bus 22. The CPU 23 then judges as to whether or not RMD data exists in the reproduced information data retrieved from the RMD area (step S2). If it is judged in step S2 that RMD data exists, then the CPU 23 stores a flag M having a logical value "1" indicating that the recording disc is a recorded disc, to an address (n+1) of the RAM 26 as shown in FIG. 8 (step S3). After the completion of the process of step S3, the CPU 23 extracts, from the RMD data, the last address of the information data recorded on the recording disc 33, and stores it at an address (n+2) of the RAM 26 shown in FIG. 8 as a management data recording start address RaI. Conversely, if it is judged in step S2 that the RMD data does not exist in the reproduced information data, the CPU 23 stores the flag M having the logical value "0" indicating that the disc 33 is a virgin disc at the address (n+1) of the RAM 26 (step S4). After the completion of the process of the step S4, the CPU 23 stores, as the management data recording start address, a last address corresponding to the position of the tail end of the UDF (Universal Disc Format) area of the recording disc 33 shown in FIG. 9, at the address (n+2) of the RAM 26 (step S5b). After the completion of the operation of the above-descried step S5a or the step S5b, the CPU 23 transmits the management information recording start address RaI stored in the RAM 26 to the host computer 10 through an interface circuit 21 (step S5c).

Through the execution of the step S6 through step S9, the CPU 23 is then placed in a receiving waiting state for the following four operation request signals which are transmitted from the host computer 10.

Recording Request Signal

A signal transmitted by the host computer 10 when recording a desired information file on the recording disc 33.

File Management Data Perusing Request Signal

A signal transmitted by the host computer 10 when it is desired to peruse file management data relating to each of the information files recorded on the recording disc 33.

Ejection Request Signal

A signal transmitted by the host computer 10 when the recording disc 33 is to be ejected from the DVD drive unit 30. The ejection request signal is also transmitted by the ejection operation device 50 provided in the information recording apparatus 20. When the user operates the ejection operation device 50 to eject the disc 33, the ejection operation device 50 transmits the ejection request signal to the bus 22.

Disk Completion Request Signal

A signal transmitted by the host computer 10 when all of the recording operations on the recording disc 33 are to be finished to complete it as an information recording disk. In response to the disk completion request signal, lead-in area LI and lead-out area LO as shown in FIG. 9 are formed on the recording disc 33. In other words, the lead-in area LI and lead-out area LO do not exist on the recording disc 33 until the disc finish request signal is transmitted.

When it is judged in the step S6 shown in FIG. 3 that the recording request signal is received, the CPU 23 then judges as to whether the flag N stored in the RAM 26 is of the logical value "0" (step S10). If it is judged in step S10 that the flag N has the logical "0" value, that is, if it is judged that the processing operation is being performed to the recording disc 33 for the first time, then the CPU 23 adds to the management data recording start address RaI stored in the RAM 26 as shown in FIG. 8, a value corresponding to the area α of the file management data FM in the recording disc 33 as illustrated in FIG. 9, and stores the added address value to an address (n+3) of the RAM 26 shown in FIG. 8, as the file recording start address RaE (step S12). In this case, the position on the recording disc 33 indicated by the management information recording start address RaI is the point "a" shown in FIG. 9. Similarly, the position on the recording disc 33 indicated by the file recording start address RaE is the point "b" in FIG. 9. The CPU 23 then stores the logical value "1" at the address (n) of the RAM 26 as a flag indicating that the process of the first sequence is complete (step S13).

After the step S13, or when it is detected in the step S10 that the flag N stored in the RAM 26 does not have the logical value "0" representing the process of the first sequence, the CPU 23 transmits a transmission ready signal to the host computer 10 via an interface circuit 21 (step S14). Upon receipt of the transmission ready signal, the host computer 10 transmits to the information recording apparatus 20, a data signal constituted by information files to be recorded on the recording disc 33 (which comprises audio data, video data, and computer data, and so on), file management data relating to the information file, and a supposed address RWa of the file management data.

Figure 10:
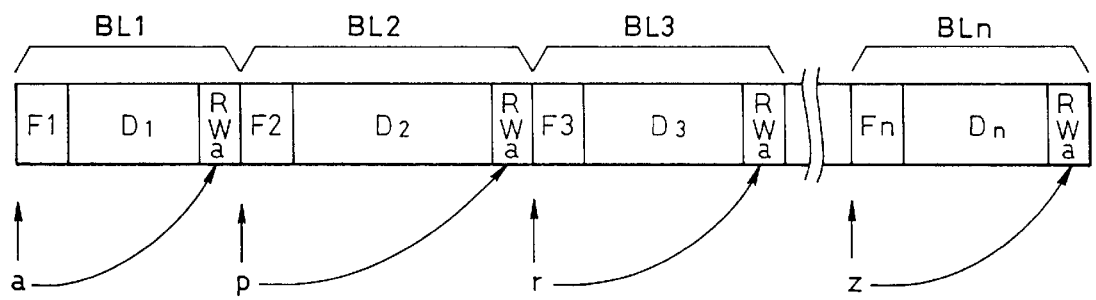
FIG. 10 is a diagram showing a supposed recording format.

FIG. 10 is a diagram showing an example of the data signal described above.

In FIG. 10, an example is shown in which the data signal being transmitted is constituted by n data signal blocks BL1 through BLn each of which comprises file management data F, information file D, and supposed address RWa. As the supposed address RWa in each data signal block BL, an imaginary address which is obtained by assuming that the file management data of each block BL is directly recorded on the recording disc 33, is described. In the example shown in FIG. 10, the supposed address of the file management data F1 is "a", and the supposed address of the file management data F2 is "p".

The CPU 23 then waits for the reception of the data signal described above (step S15). When it receives the data signal, the CPU 23 judges as to whether or not the received data is the file management data F (step S16). If it is judged in step S16 that the received data is the file management data F, then the CPU 23 judges as to whether the total amount of the file management data received up to that time has exceeded the area α of the file management data FM on the recording disc 33 (step S18). If it is judged in step S18 that the total amount of the file management data received so far has not exceeded the area α of the file management data FM, that is, if it is judged that an unoccupied space exists in the area of the file management data FM, the CPU 23 stores the file management data received in the manner as described above to an address indicated by the supposed address RWa in the FRAM (ferrodielectric RAM) shown in FIG. 2 (step S19). The FRAM 40 is a non-volatile type semiconductor memory. After the completion of the step S19, the operation of the CPU 23 returns to the execution of the step S15, to repeatedly execute the operations described above.

In the step S16 described above, if it is judged that the received data is not the file management data, that is, if it is judged that the received data is the information file D, the CPU 23 supplies the received information file D to the encoder 28. Furthermore, the CPU 23 transmits a recording instruction signal to the DVD drive unit 30 to move the recording/reproduction head to the position on the recording disc 33 indicated by the file recording start address RaE, and to start the recording operation from that position (step S20). In response to the execution of the operation of the step S20, the encoder 28 performs a predetermined coding and modulating process to the information file, and supplies a resultant coded signal to the laser driving circuit 29. The laser driving circuit 29 generates a recording signal having a level which varies in accordance with the coded signal, and supplies it to the recording/reproduction head 34. By the execution of the operation of the above-described step S20, the recording/reproduction head 34 starts the recording of the recording signal corresponding to the information file D on the recording disc 33 from the position indicated by the file recording start address RaE.

The CPU 23 then sets an address corresponding to the tail end of the recording position on the recording disc 33 for that information file D as a new file recording start address RaE, and overwrites it at an address (n+3) of the RAM 26 (step S21). Subsequently, the CPU 23 judges as to whether or not the reception of the series of data signals shown in FIG. 10 has all been completed (step S22). If it is judged in this step S22 that the reception of the data signals is not complete, the operation of the CPU 23 returns to the execution of the step S15, to repeatedly execute the operations described above.

Figure 11:
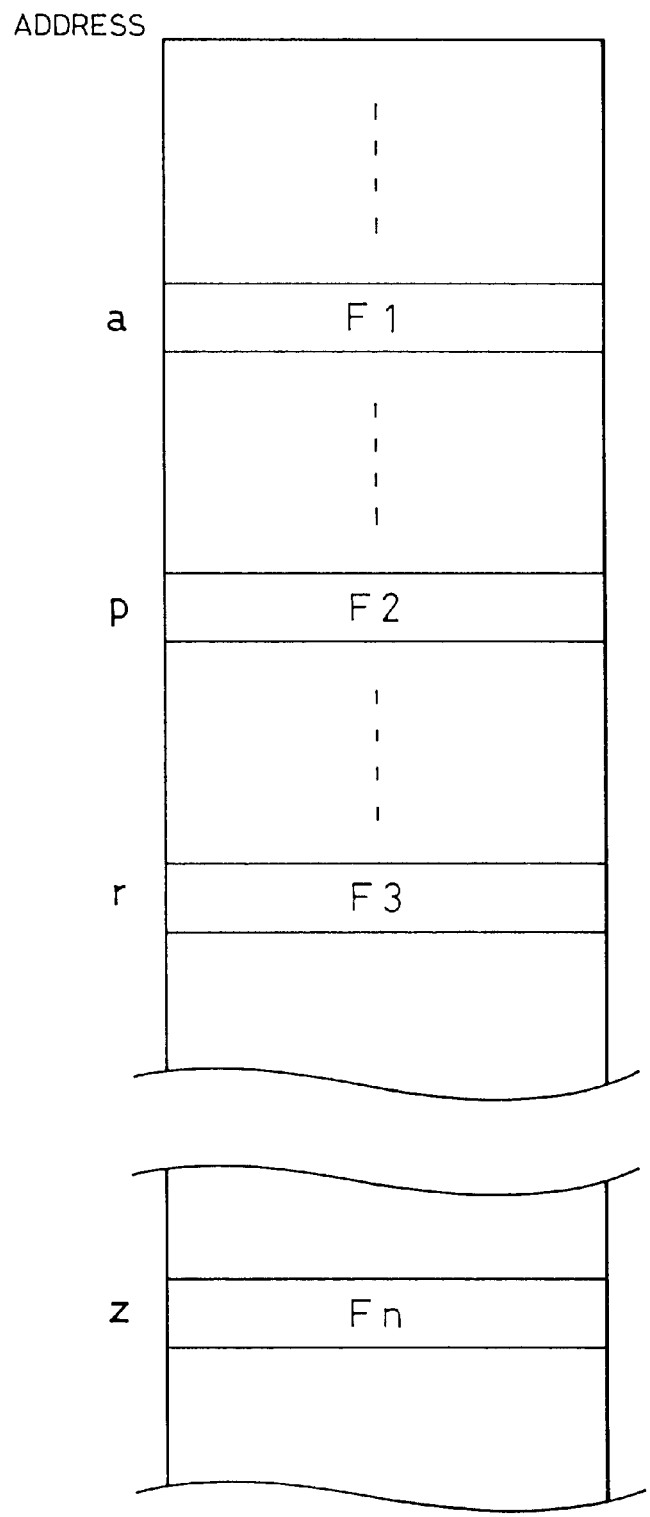
FIG. 11 is a diagram showing a part of the memory map of FRAM 40.

As described above, by the repeated execution of the operations of the steps S15 through S19, the file management data $F_1$ through $F_n$ in the data signal shown in FIG. 10 are respectively stored in the FRAM 40. The file management data $F_1$ through $F_n$ are respectively stored in the address indicated by the supposed address RWa as illustrated in FIG. 11. According to the data structure shown in FIG. 10, the supposed address RWa of the file management data $F_1$ is address "a", the file management data $F_1$ is stored in the address "a" of the FRAM 40. Similarly, the supposed address RWa of the file management data $F_2$ is the address "p", the file management data $F_2$ is stored at the address "p" of the FRAM 40.

By the repeated execution of the operations of the steps S15, S16, S17, S20 and S21, information files $D_1$ through $D_n$ in the data signal shown in FIG. 10 are consecutively stored from the position indicated by the file recording start address RaE, that is, the point "b" shown in FIG. 9.

In the step S18 described above, if the total amount of the file management data F received so far has exceeded the area α of the file management data FM, that is, if the area of the file management data is full, the CPU 23 reads all of the file management data pieces F stored in the FRAM 40 as illustrated in FIG. 11. The CPU 23 then produces a file management data FM by unifying all of the retrieved file management data, supplies it to the encoder 28, and transmits the recording instruction signal to the DVD drive unit 30, to move the recording/reproduction head to the position on the recording disc 33 indicated by the management data recording start address RaI stored in the RAM 26, and to start the recording operation from that point (step S23).

In accordance with the execution of the operation of the step S23, the encoder 28 supplies, to the laser driving circuit 29, the coded signal obtained by performing the predetermined coding and modulating process to the above-described file management data FM. The laser driving circuit 29 generates a recording signal having a level which varies with the coded signal, and supplies it to the recording/reproduction head 34.

In accordance with the execution of the step S23, the recording/reproduction head 34 starts the recording of the recording signal corresponding to the file management data FM on the recording disc 33 from the position on the recording disc 33 indicated by the management data recording start address RaI.

For instance, a file management data $FM_1$ obtained by unifying the file management data $F_1$ through $F_n$ shown in FIG. 11 is recorded from the position on the recording disc 33 indicated by the management data recording start address RaI, that is the point "a" shown in FIG. 9.

After the execution of the operation of the step S23, the CPU 23 renews the contents of the management data recording start address RaI by overwriting the file recording start address RaE stored at the address (n+3) of the RAM 26, at the address (n+2) of the RAM 26 (step S24).

For instance, if information file $D_{n+1}$ exists beyond the information file $D_n$ shown in FIG. 9, and the volume of the file management data $FM_1$ has exceeded α after the completion of the recording of the information file $D_n$, the tail end address of the information file $D_n$ is set as the file recording start address RaE at the step S21. That is, the address corresponding to the point "c" shown in FIG. 9 is set as a new file recording start address RaE, and the address indicated by the file recording start address RaE is set as the new management data recording start address RaI through the execution of the step S24. After the execution of the operation of the step S24, the CPU 23 produces a new management data recording start address RaE by adding an amount corresponding to the area α of the file management data FM to the management data recording start address RaI, and stores the new management data recording start address RaE by overwriting it at the address (n+3) of the RAM 26 (step S25). After the step S25, the CPU 23 clears the stored contents of the FRAM 40 totally (step S26). The CPU 23 then sets the management data recording start address RaI obtained at the step S24 as the supposed address RWa (step S261), and transmits the management data recording start address RaI to the host computer 10 (step S262). After the completion of the operation of the step S262, the operation of the CPU 23 returns to the execution of the operation of the step S19, to repeat the operations described above.

By the execution of the operations of the steps S23 through S26, S261 and S262, the file management data $F_{n+1}$ which has not been included in the area of file management data $FM_1$ shown in FIG. 9 is recorded in a unified manner in the area of the file management data $FM_2$ shown in FIG. 9.

If it is judged in the aforementioned step S22 that the reception of the data signal from the host computer 10 is fully completed, the CPU 23 judges as to whether or not the logical value of the flag M stored in the RAM 26 is "0" (step S27). In the step S27, if it is judged that the logical value of the flag M is "0", which indicates that the recording disc 33 is a virgin disc, the CPU 23 resets the logical value of the flag M to "1" (step S28). After the step S28, or when it is judged in step S27 that the logical value of the flag M is not "0", the CPU 23 transmits a recording complete signal to the host computer 10 via the interface circuit 21, to inform the host computer 10 of the completion of the recording operation (step S29). After the completion of the operation of the step S29, the operation of the CPU 23 returns to the execution of the process of the step S6 shown in FIG. 3.

If it is judged in step S7 shown in FIG. 3 that a file management data perusal request signal from the host computer 10 is received, the CPU 23 at first judges as to whether or not the logical value of the flag N stored in the RAM 26 is "0" (step S71). If it is judged in the step S71 that the logical value of the flag N is "0", then the CPU 23 judges as to whether or not the logical value of the flag M is "0" (step S72). If it is judged in the step S72 that the logical value of the flag M is "0", which indicates that the recording disc 33 is a virgin disc, the CPU 23 transmits a virgin disc signal to the host computer 10 via the interface circuit 21, to inform it to the host computer 10 (step S73). Conversely, if it is judged in step S71 that the logical value of the flag N is not "0", which indicates that the operating process is being performed on the recording disc 33 for the second time or more, the CPU 23 reads all of the file management data pieces F which have been stored in the FRAM 40, and transmits them to the host computer 10 via the interface circuit 21 (step S76). If it is judged in the step S72 that the logical value of the flag M is not "0", which indicates that the recording disc 33 is not a virgin disc, then the CPU 23 transmits the reproduction instruction signal to the DVD drive unit 30, to read the newest file management data FM recorded in the tail end of the recording area of the recording disc 33 (step S74). In response to the execution of the process of the step S74, the DVD drive unit 30 supplies, to the decoder 25, the signal retrieved by reading the newest file management data FM from the recording disc 33 as described above. The decoder 25 in turn reproduces the file management data FM based on the retrieved signal, and transmits the data on the bus 22.

In this state, the CPU 23 sends the file management data FM being transmitted on the bus 22 to the host computer 10 via the interface circuit 21 (step S75). When any one of the steps S73, S75, and S76 has been completed, the operation of the CPU returns to the execution of the process of the step S6 shown in FIG. 3.

If it is judged in the step S9 shown in FIG. 3 that the disc complete request signal from the host computer 10 is received, the CPU 23 judges as to whether or not the logical value of the flag N stored in the RAM 26 is "0" (step S91). If it is judged in the step S91 that the logical value of the flag N is "0", then the CPU 23 judges as to whether or not the logical value of the flag M is "0" (step S92). If it is judged in the step S92 that the logical value of the flag M is "0", which means that the recording disc is a virgin disc, then the CPU 23 transmits the virgin disc signal to the host computer 10 via the interface circuit 21, to inform it to the host computer 10 (step S93). Conversely, if it is judged in step S92 that the logical value of the flag N is not "0", which means that the operating process is to be performed for the recording disc 33 twice or more, then the CPU 23 transmits a head move instruction signal to the DVD drive unit 30, to move the recording/reproduction head 34 to the position on the recording disc 33 indicated by the management data recording start address RaI stored in the RAM 26 (step S94). Subsequently, the CPU 23 reads all of the file management data pieces F stored in the FRAM 40, and supplies to the encoder 28 the file management data FM obtained by unifying the read file management data. Furthermore, the CPU 23 transmits the recording instruction signal to start the recording operation to the DVD drive unit 30 (step S95). In response to the execution of the operations of the steps S94 and S95, the encoder 28 performs the predetermined coding and modulating process to the file management data FM, and supplies a resultant coded signal to the laser driving circuit 29. The laser driving circuit 29 in turn generates a recording signal having a level which varies with the coded signal, and supplies it to the recording/reproduction head 34. By the execution of the steps S94 and S95, the recording/reproduction head 34 performs the recording of the recording signal corresponding to the file management data FM on the recording disc 33 from the position indicated by the above-described management data recording start address RaI. After the completion of the process of the step S95, or when the logical value of the flag M is not "0", the CPU 23 reads all of the file management data pieces recorded on the recording disc 33 as shown in FIG. 9, and supplies them to the encoder 28, and transmits to the DVD driving unit 30 a recording instruction signal to start the recording operation from the head position of a UDF bridge area shown in FIG. 9 (step S96).

By the execution of the operation of the step S96, the recording/reproduction head 34 retrieves all of the file management data pieces recorded on the recording disc 33, and consecutively records the retrieved data in the UDF bridge area of the recording disc 33. After the completion of the recording operation, the CPU 23 supplies, to the encoder 28, control data indicating the type and recording capacity of the recording disc 33 and so on, and supplies to the DVD drive unit 30 a recording instruction signal to start the recording operation from the head position of the lead-in area LI on the recording disc 33 shown in FIG. 9 (step S97).

In accordance with the execution of the operation of the step S97, the recording/reproduction head 34 performs the recording of a recording signal corresponding to the above-described control data in the lead-in area LI of the recording disc 33. After the completion of the recording operation, the CPU 23 supplies a lead-out code indicating the lead-out area to the encoder 28, and supplies to the DVD drive unit 30 a recording instruction signal to start the recording operation from the tail end of the recorded area of the recording disc 33 shown in FIG. 9 (step S98). In accordance with the execution of the operation of the step S98, the recording head performs the recording of the above-described lead-out code from the tail end of the recorded area of the recording disc 33, to form a lead-out area LO shown in FIG. 9.

After the completion of the operation of the step S98 or the operation of the step 93, the operation of the CPU 23 returns to the execution of the step S6 shown in FIG. 3.

If it is judged in the step S8 shown in FIG. 3 that an ejection request signal is transmitted from the host computer 10 or the ejection operation device 50, then the CPU 23 judges as to whether the logical value of the flag N shored in the RAM 26 is "0" (step S81). If it is judged in the step S81 that the logical value of the flag N is not "0", which indicates that the processing operation is to be performed for the recording disc 33 twice or more, then the CPU 23 transmits to the DVD driving unit 30 a head transfer instruction signal to move the recording/reproduction head 34 to a position on the recording disc 33 indicated by the management data recording start address RaI stored in RAM 26 (step S83). Then the CPU 83 reads all of the file management data pieces F stored in the FRAM 40, supplies file management data FM obtained by unifying the read file management data to the encoder 28, and transmits the recording instruction signal to start the recording operation to the DVD driving unit 30 (step S84). In accordance with the execution of the operation of the steps S83 and S84, the encoder 28 supplies, to the laser driving circuit 29, a coded signal obtained by performing the predetermined coding and modulating process to the above-mentioned file management data FM. The laser driving circuit 29 generates a recording signal having a level which varies with the coded signal and supplies it to the recording/reproduction head 34. By the execution of the operations of the steps S83 and S84, the recording/reproduction head 34 starts the recording of the recording signal corresponding to the file management data FM on the recording disc 33 from the position indicated by the above-mentioned management data recording start address RaI.

Then the CPU 23 transmits a head transfer instruction signal to the DVD driving unit 30 to move the recording/reproduction unit 34 to the head position of the RMD area shown in FIG. 9. Furthermore, the CPU 23 supplies, to the encoder 28, RMD data which indicates various information such as the recording condition including the recording power and the strategy at the recording on the recording disc 33, and the final file recording start address RaE, and transmits the recording instruction signal to start the recording operation to the DVD driving unit 30 (step S85). By the execution of the operation of the step S85, the above-described RMD data is recorded in the RMD area shown in FIG. 9.

After the completion of the step S85, or when it is judged in the step 81 that the logical value of the flag N is "0", the CPU 23 then transmits the ejection instruction signal to the DVD driving unit 30, to eject the recording disc 33 loaded in the DVD driving unit 30 (step S82). By the execution of the operation of the step S82, the DVD driving unit 30 ejects the recording disc 33 on the turntable 32 to the outside of the information recording apparatus 20.

After the completion of the operation of the step S82, the operation of the CPU 23 leaves the above-explained information recording subroutine shown in FIG. 3 through FIG. 7, and returns to the execution of the main routine (not shown).

As explained in the foregoing, according to the present invention a plurality of incoming information files are consecutively recorded on the recording disc (step S20). At this time, the file management data pieces respectively relating to each of the information files area not recorded on the recording disc, and temporarily recorded on the other memory device, that is the FRAM 40, (step S19). In this state, when the ejection operation to eject the recording disc to the outside is performed (step S8), the file management data pieces recorded on the recording device (FRAM 40) are unified, then recorded on a predetermined area of the recording disc (S84). Subsequently, the recording disc is ejected to outside (step S82).

Figure 1:
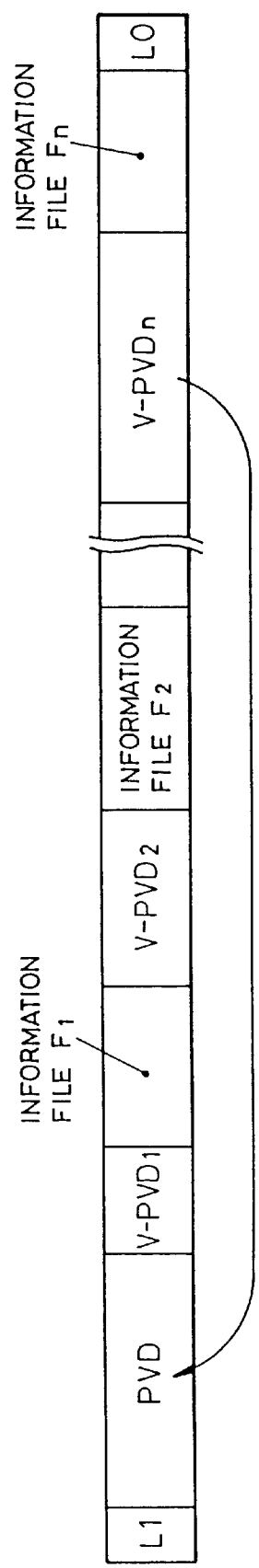
FIG. 1 is a diagram showing a recording format on a recording disc according to the Incremental Write System.

Consequently, according to the present invention the efficiency of recording can be raised as compared with the conventional recording method shown in FIG. 1 in which the file management data is recorded on the recording disc for each of the information files.

In the embodiment described in the foregoing, the file management data stored in the FRAM 40 is recorded on the recording disc in response to the ejection operation. However, the present invention is not limited to that type of operation. For example, it is possible to modify the described method in such a way that the file management data stored in the FRAM is recorded on the recording disc when the electric power of the information recording apparatus is being turned off, or in response to any one of various instructions supplied from the host computer as occasion demands.

Briefly speaking, it is sufficient to arrange the method that the file management data stored in the FRAM is recorded on the recording disc in response to a command which is generated when the recording operation for the recording disc is brought to a pause in any form.

In the embodiment described in the foregoing, only the file management data relating to the information files to be additionally written is stored in the FRAM. It is however possible to modify the method in such a way that the file management data already recorded on the recording disc is previously retrieved, and it is recorded after being unified with file management data to be newly recorded.

Furthermore, in the described embodiment the FRAM 40 is used as memory means for temporarily storing the file management data. The present invention is however not limited to this type of structure. For example, any of the hard disc device, RAM, flash memory which are provided in the host computer may be used as the memory means. Furthermore, if a cartridge type device is used, it is possible to place the memory means within it.

What is claimed is:

1. An information file recording method for recording information by an information recording apparatus including a recording medium driving means for driving a loaded recording medium to record data on said recording medium and an erasable memory means, the recording method comprising:

a first step of recording an information file on said recording medium;

a second step of recording file management data relating to said information file on said memory means; and a third step of retrieving said file management data stored in said memory means and recording said file management data in a predetermined area of said recording medium.

2. An information file recording method for recording information by an information recording apparatus including a recording medium driving means for driving a loaded recording medium to record data on said recording medium and an erasable memory means, the recording method comprising:

a first step of recording an information file on said recording medium;

a second step of recording file management data relating to said information file in said memory means;

a third step of retrieving said file management data stored in said memory means and recording said file management data in a predetermined area of said recording medium in response to an ejection operation; and a fourth step of ejecting said recording medium from said information recording apparatus after said third step has been completed.

3. An information file recording method as claimed in claim 1, further comprising a step of retrieving said file management data from said memory means in response to a file perusal request for said information file recorded on said recording medium, and transmitting outside said file management data.

4. An information file recording method as claimed in claim 2, further comprising a step of retrieving said file management data from said memory means in response to a file perusal request for said information file recorded on said recording medium, and transmitting outside said file management data.

5. An information file recording method as claimed in claim 1, wherein said recording medium is an over-writing type recording disc.

6. An information file recording method as claimed in claim 2, wherein said recording medium is an over-writing type recording disc.

7. A recording apparatus for recording an information file on a loaded recording medium, comprising:

a memory means for storing file management data relating to said information file;

a recording medium driving means for driving said recording medium to record said information file on said recording medium; and an ejecting means for ejecting said recording medium in response to an ejection operation, wherein said recording medium driving means performs the operations of retrieving said file management data from said memory means immediately before said recording medium is ejected by said ejecting means, and recording said file management data in a predetermined area of said recording medium.

8. A recording apparatus as claimed in claim 7, wherein said recording medium is a write once type recording medium.

9. A recording apparatus as claimed in claim 7, wherein said memory means is a non-volatile type random access memory.

* * * * *